United States Patent [19]
Orlando et al.

[11] Patent Number: 4,944,141
[45] Date of Patent: Jul. 31, 1990

[54] HEIGHT CONTROL SYSTEM

[75] Inventors: Franklin P. Orlando, Morgan Hill; Lee D. Butler, Kingsburg; Donald A. Luttrell; Joseph S. Goulart, Santa Clara, all of Calif.

[73] Assignee: FMC Corporation, Chicago, Ill.

[21] Appl. No.: 281,732

[22] Filed: Dec. 9, 1988

[51] Int. Cl.$^5$ .............................................. A01D 34/28
[52] U.S. Cl. ...................................... 56/17.1; 56/210; 56/214; 56/DIG. 10
[58] Field of Search .................... 56/15.2, 17.1, 17.2, 56/171, 214, 217, DIG. 10, 210

[56] References Cited

U.S. PATENT DOCUMENTS

| | | | |
|---|---|---|---|
| 2,972,847 | 2/1961 | Mathews, Jr. | 56/217 X |
| 3,269,685 | 8/1966 | Wallace | 56/210 X |
| 4,335,570 | 6/1982 | Fitzmaurice | 56/327 |

FOREIGN PATENT DOCUMENTS

| | | | |
|---|---|---|---|
| 683662 | 9/1979 | U.S.S.R. | 56/10.2 |
| 809831 | 3/1959 | United Kingdom | 56/210 |

Primary Examiner—William P. Neuder
Attorney, Agent, or Firm—A. J. Moore; R. C. Kamp; R. B. Megley

[57] ABSTRACT

A height control system is disclosed for use on a harvester and includes at least one lightweight wheel which rides over the crop being harvested at a location forwardly of the vehicle in an undisturbed area of the crop without damaging the crop. The wheel detects upward or downward inclined portions of the ground and controls power means which raises or lowers at least one plant handling component of the harvester for maintaining the component at the desired elevation relative to the ground. The system also includes control means which sense varying ground speed and prevents undesirable jerky raising and lowering of the conveying components in response to the wheel riding over small articles such as rocks at different speeds.

36 Claims, 6 Drawing Sheets

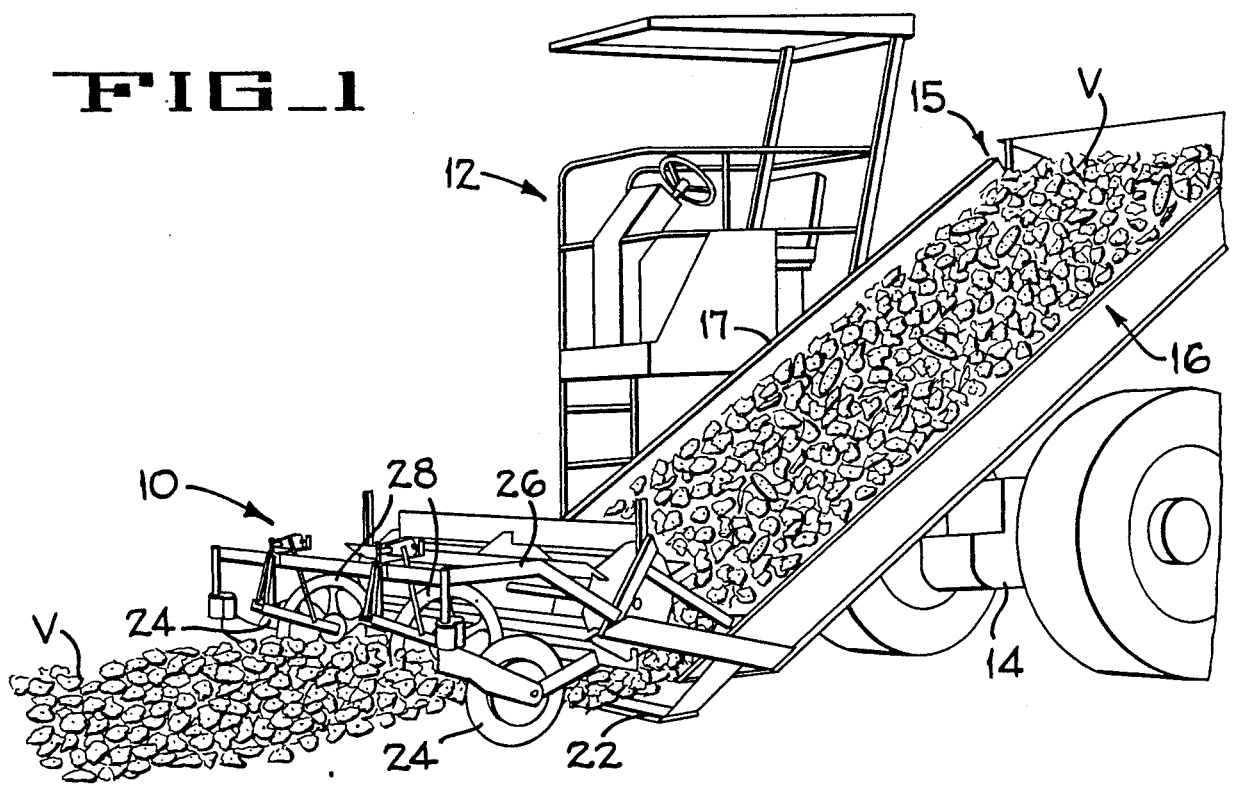
FIG_1
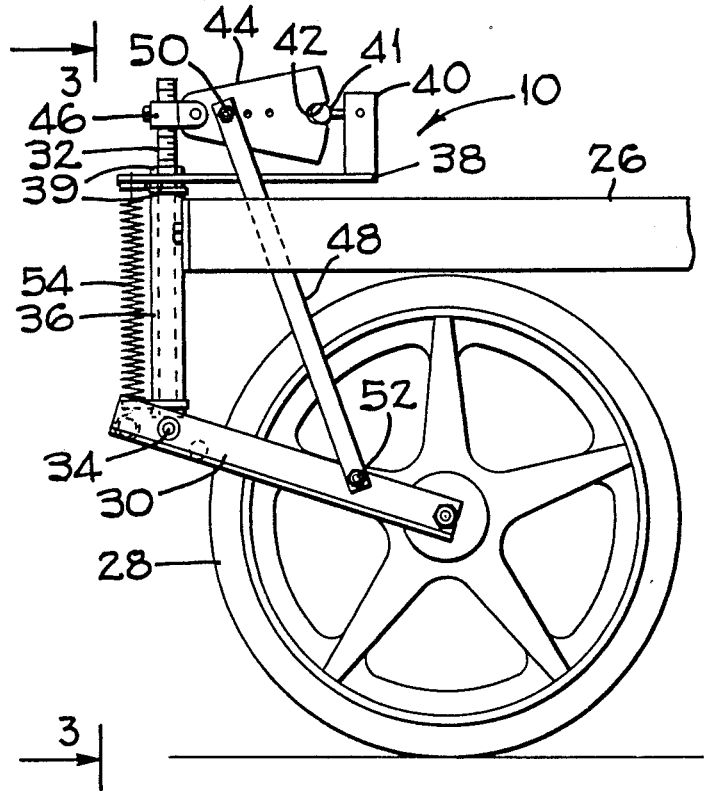
FIG_2
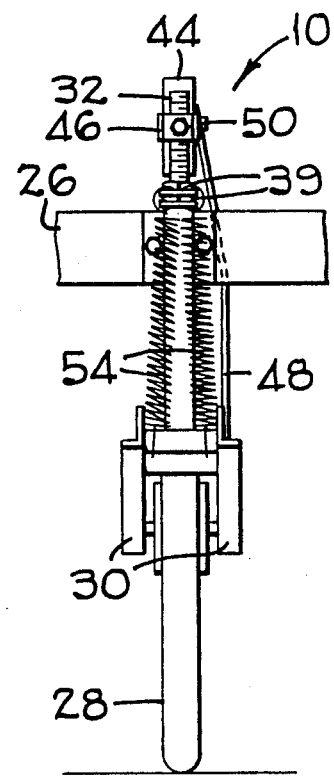
FIG_3

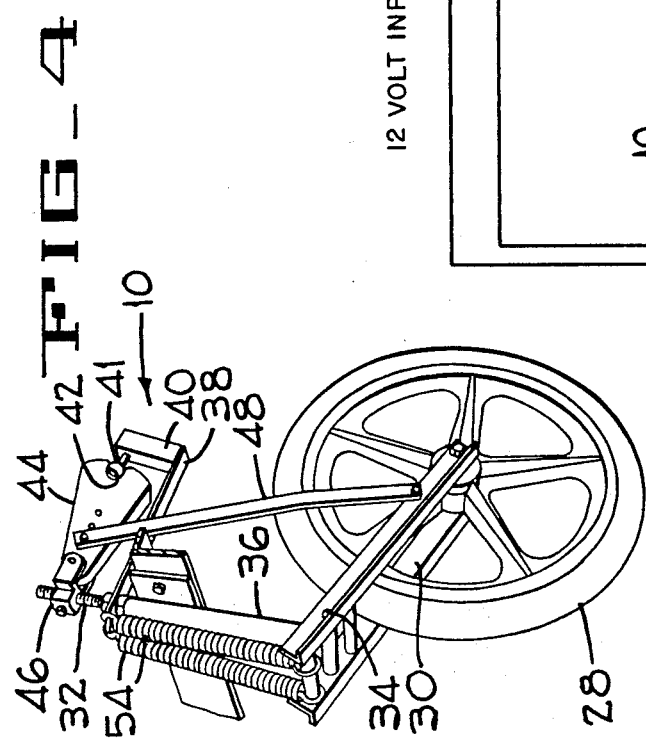
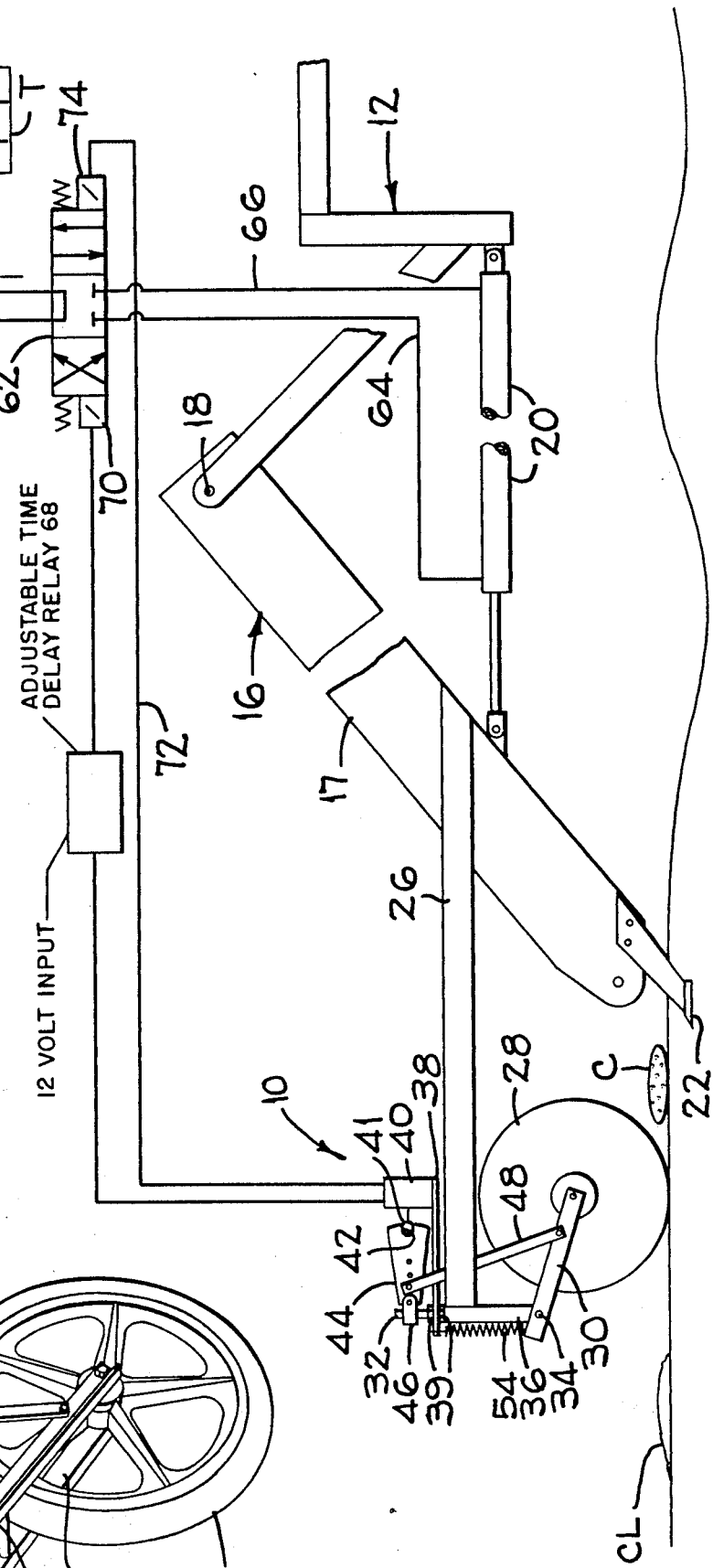

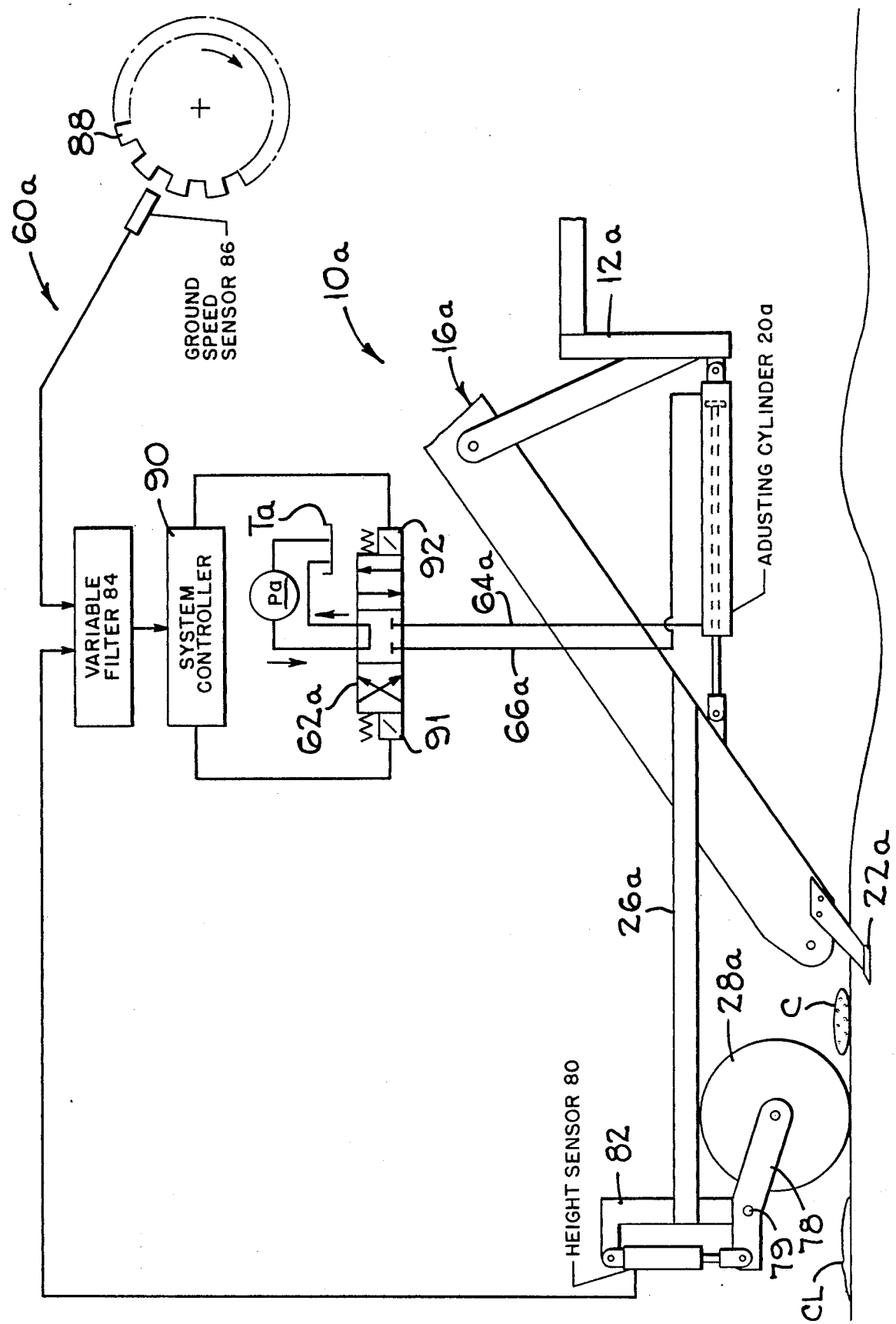
FIG_6

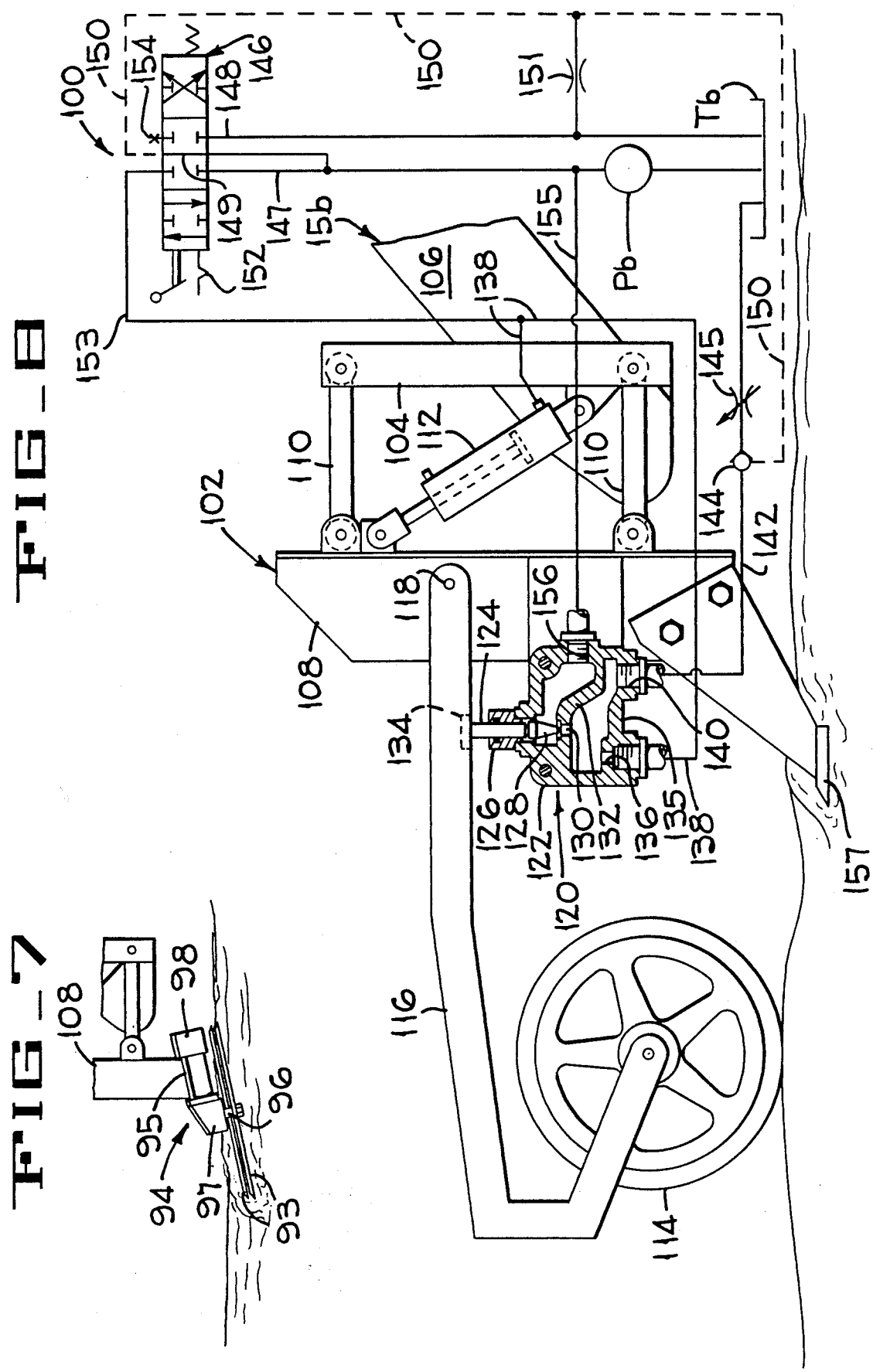

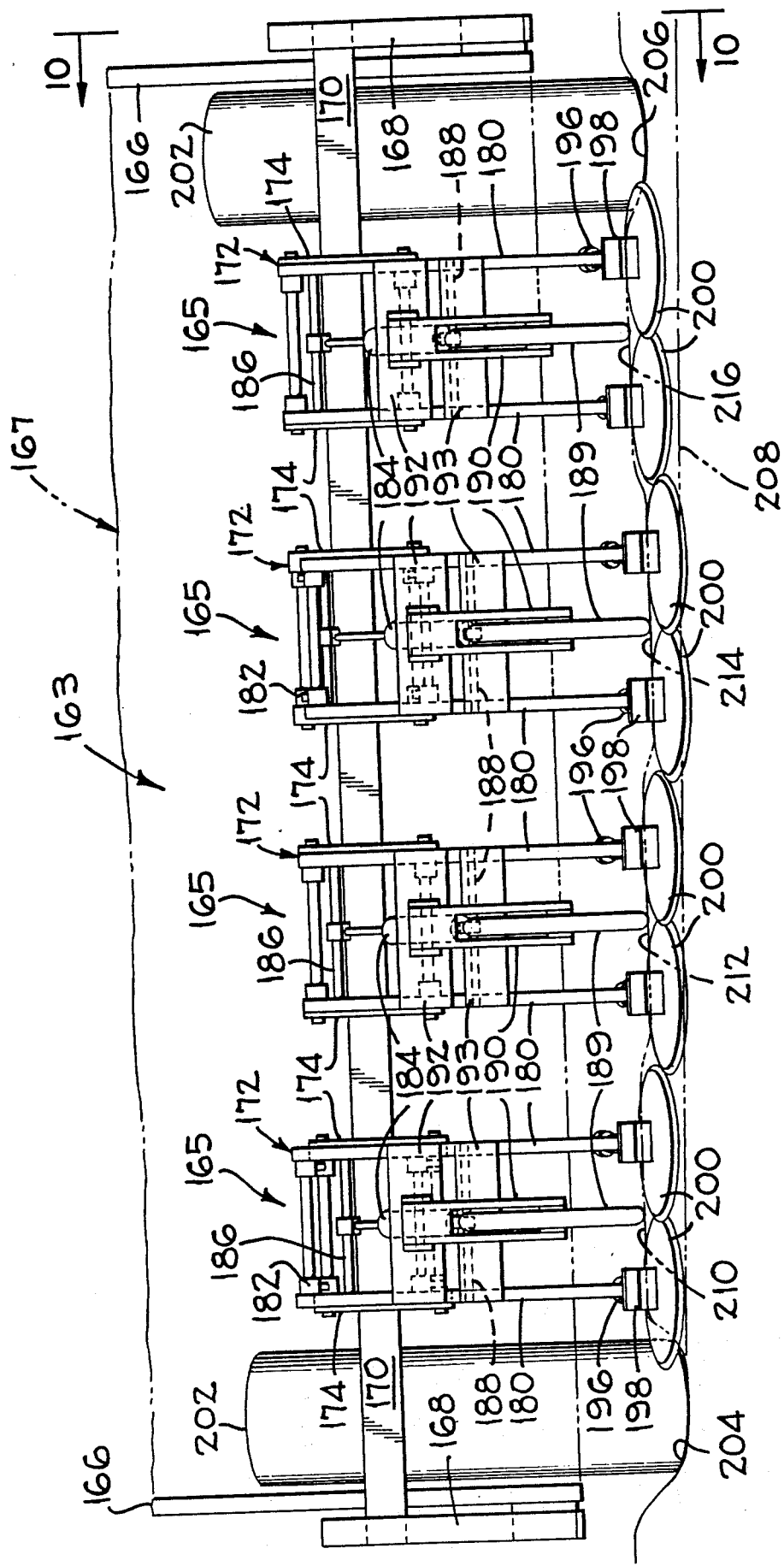

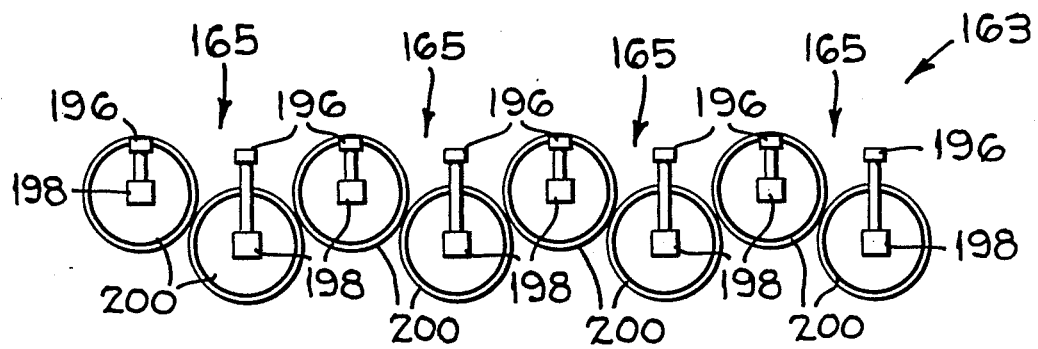
FIG_11
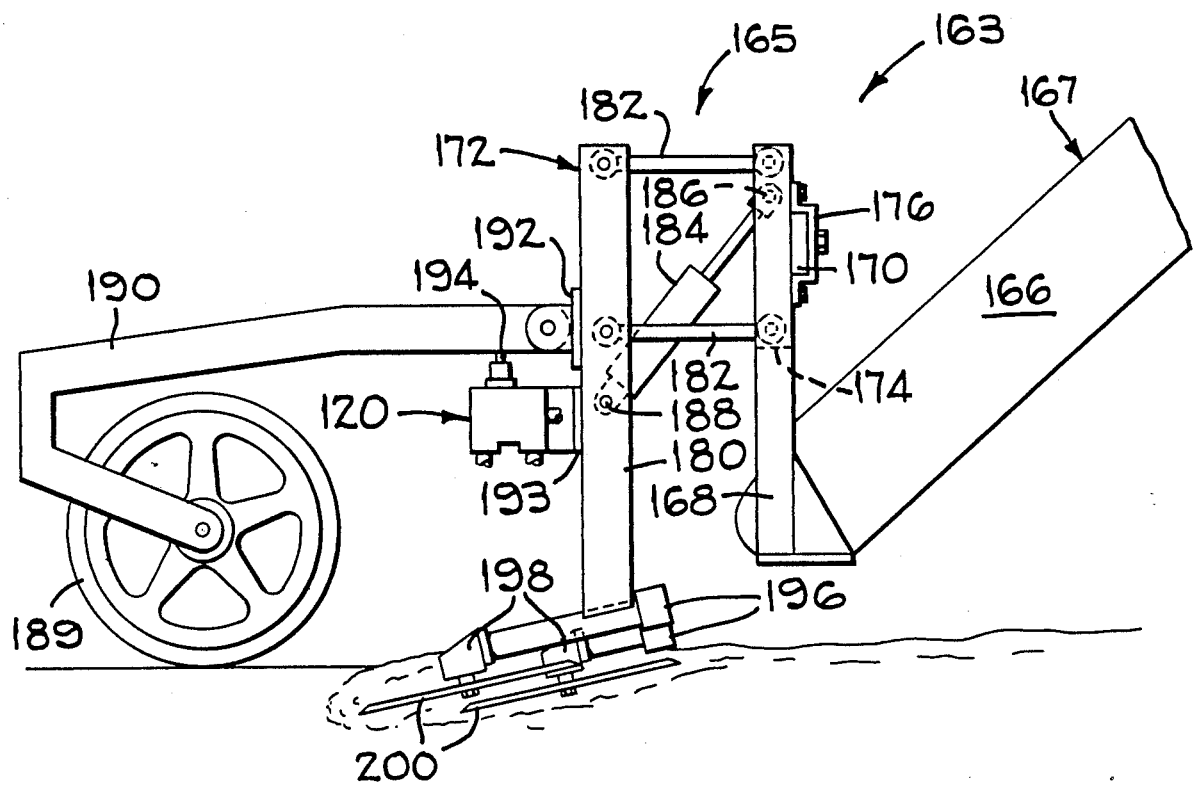
FIG_10

4,944,141

HEIGHT CONTROL SYSTEM

CROSS REFERENCE TO RELATED APPLICATION

The present application relates to Butler et al Application entitled PLANT HARVESTER, which application was filed on Dec. 20, 1988 and is presently assigned to the Assignee of the present invention.

BACKGROUND OF THE INVENTION

Field of the Invention

The present invention relates to a wheeled height control system which senses the ground level ahead of the harvesting components and maintains the desired height of certain of the harvesting components relative to the ground, which components include the lower leading end portion of a conveyor and a ground engaging cutter for releasing the plants from the ground. The system also includes time delay control means which preclude height adjustment of the conveyor and cutter when the wheel contacts minor undulations of the supporting surface.

SUMMARY OF THE INVENTION

The height control system of the present invention includes at least one lightweight freely rotatable wheel and tire assembly pivotally connected to, and disposed forwardly of, the header of a mobile harvester. Vertical movement of the wheel is transmitted to a switch which actuates a valve for directing hydraulic fluid into a hydraulic cylinder which adjusts the height of components on the forward end of the harvester relative to the harvesters uneven supporting surface. A time delay relay is incorporated in the system to avoid adjustment of the height of the header and components attached thereto in the event the light weight wheel rides over small obstructions as cucumbers or clods.

BRIEF DESCRIPTION OF THE DRAWINGS

FIG. 1 is a perspective of the forward end portion of a cucumber harvester illustrating a pair of lightweight height control wheels thereon.

FIG. 2 is a diagrammatic elevation of one of the height control systems illustrating one of the wheels moving over a generally horizontal surface such as the surface of a flat ridge.

FIG. 3 is a front elevation of one of the height control systems.

FIG. 4 is a perspective of one of the wheel assemblies.

FIG. 5 is a diagrammatic operational view illustrating electrical and hydraulic circuitry for raising or lowering the forward end of a crop receiving conveyor in response to contour variations in the ground, and further illustrating an adjustable time delay relay for preventing adjustment of a conveyor in response to the wheel riding over a clod or cucumber.

FIG. 6 is a diagrammatic operational view similar to FIG. 5 but illustrates a modified height control wheel assembly, and a circuit which provides different height control responses for different ground speeds of the harvester.

FIG. 7 is an elevation of an alternate type of vine cutter illustrating two driven rotary vine cutters in cutting position in the ground.

FIG. 8 is a diagrammatic operational view of a third embodiment of a modified height control system using a hydraulic metering valve connected to the vehicle by a parallelogram linkage, the size of the valve being exaggerated.

FIG. 9 is a front elevation of a fourth embodiment of the invention illustrating a plurality of pairs of rotary vine cutters, with each pair being independently controlled by an associated lightweight wheel for harvesting crops which may vary in elevation both transversely and longitudinally of the harvester.

FIG. 10 is a section taken along lines 10-10 of FIG. 9.

FIG. 11 is a diagrammatic plan view illustrating the orientation of the disc cutters of FIGS. 9 and 10.

DESCRIPTION OF THE PREFERRED EMBODIMENT

The header height control system 10 (FIG. 1) of the present invention is intended for use on a power driven harvester 12 (only the front portion being shown), such as a cucumber harvester. However, it will be understood that the height control system is not limited to harvesting crops supported on vines or foliage, but may be used with other harvesters such as grain combines and sod harvesters.

The cucumber harvester 12 includes a chassis 14 which supports an upwardly and rearwardly inclined header 15 which includes a conveyor 16 having a frame 17 which is supported on the chassis 14 for pivotal movement about a generally horizontal axis 18 (FIG. 5). A hydraulic cylinder 20 is connected between the chassis and the lower end portion of the conveyor. A transversely disposed vine cutter 22 extends the full width of the swath of vines being harvested. The vine cutter 22 is designed to cut the vines V (FIG. 1) several inches below the ground level to assure that the vines are severed and thus will be directed upwardly onto the conveyor 16. As shown in FIG. 1, a pair of caster wheel cutters 24 are pivotally mounted on a sub-frame 26 connected to the lower end portion of the conveyor frame 17. The caster wheel cutters are spaced apart a distance substantially equal to the width of the conveyor 16 and cooperate with the transverse cutter 22 to cut a swath of vine longitudinally of the vehicle and substantially equal to the width of the header 15.

Having reference to FIGS. 2-5, each height control system 10 includes a lightweight wheel 28, such as a bicycle wheel, which is supported for rotation in a yoke 30. The yoke is pivotally connected to the lower end of an upright or a substantially vertical rod 32 by a pivot pin 34 for pivotal movement about a substantially horizontal axis. The rod is pivotally received in a tube 36 secured to the sub-frame 26 for pivotal movement about a generally vertical axis. A bracket 38 is rigidly secured to the upper threaded end portion of the rod 32 by a pair of nuts 39. The bracket supports a double pole switch 40 having its actuating element 41 received in a notch 42 in a switch actuating arm 44 that is pivotally supported by a U-shaped connector 46 that is screwed onto and then clamped in place on the threaded upper end portion of the rod 32. The yoke 30 and switch actuating arm 44 are pivotally connected together by a link 48 and pivot pins or bolts 50,52. Thus, pivotal movement of the wheel 28 up or down due to variations in the elevation of the ground upon which the wheel rides will actuate the switch 40. It is noted that the upper portion of the link 48 may be connected to any one of three holes in the switch arm 44 for varying the sensitivity to movement of the wheel 28. A pair of springs 54 are connected between the yoke 30 and the bracket 38 and are used to compress the vines to allow the wheels to follow the ground contour.

FIG. 5 diagrammatically illustrates a combined hydraulic and electrical circuits 60 for actuating the cylinder 20 to raise or lower the sub-frame 26 and the forward end of the conveyor 16 along with the components supported thereon including the horizontal and vertical vine cutters 22,24, respectively. The circuit 60 includes a hydraulic pump P which is driven by the harvester's engine (not shown) and receives hydraulic fluid from a tank T. The pump circulates fluid through a four-way solenoid operated valve 62 when in the illustrated centered position. When the core of the valve is moved to the parallel passage position, high pressure fluid enters the rod end of the cylinder 20 through conduit 64 thus lowering the forward end of the conveyor 16 and the sub-frame 26. When the valve 62 is shifted to its cross-passage position, high pressure fluid will enter the case end of the cylinder 20 through conduit 66 thus raising the forward end of the conveyor 16 and the sub-frame 26 plus the components thereon.

The electrical portion of the circuit 60 (FIG. 5) is powered by the harvester's conventional 12 volt system and includes the double pole switch 40 and a conventional adjustable time delay relay 68 which is set to prevent or delay a signal being sent to solenoid 70. The time delay relay 68 prevents the shifting of the core of valve 62 in response to the wheel 28 riding over a small abutment such as a cucumber C or clod CL. Thus, although the wheel 28 will momentarily actuate the switch 40 in response to quick movement of the wheel up and down, the adjustable time delay relay will prevent that signal from being sent to the solenoid 70 thus preventing the lower end of the conveyor 16, and components attached thereto, from raising. However, if the wheel 28 is raised for a longer time period by an upwardly inclined portion of the ground, the solenoid 70 will be energized thus extending the piston rod of hydraulic cylinder 20 which raises the lower end of the conveyor 16 and the horizontal and vertical vine cutters 22,24 (FIG. 1) until the desired horizontal position of these components relative to the surface of the ground is again established. The wheel 28 then returns to its normal position thereby returning the switch 40 and the solenoid valve 62 to their desired neutral positions.

When a depression in the soil is detected by one of the height adjustment wheels 28, the wheel will move downwardly thereby actuating the switch element 41 causing a "down" signal to be sent through a conduit 72 to a solenoid 74 which shifts the core of valve 62 to its parallel passage position thus directing hydraulic fluid into the rod end of the cylinder 20 thereby lowering the lower end of the conveyor 16 until the desired spacing of the ground is reached at which time the wheel 28 will return to its normal position allowing the valve 62 to return to its neutral position.

If row crops are to be harvested, such as cucumbers which are usually planted in flat topped ridges, the harvester preferably harvests two ridges at a time, and the two lightweight wheels ride over the vines and cucumbers on associated ones of the ridges in front of the harvester without damaging the cucumbers.

The amount of raising and lowering the lower end of the conveyor 16 (FIG. 5) and the cutters 22 and 24 are determined by the magnitude of the height variations in the soil as detected by the light weight wheels 28 which at all times, while harvesting, will be supported on the soil. When a substantial indentation is detected in the soil by one (or both) wheels 28, that wheel will move downwardly relative to the forward end of the conveyor causing the associated actuating arm 44 to pivot downwardly thereby sending an electrical signal through the double pole switch 40, through the conduit 72 and into the solenoid 74 which causes high pressure hydraulic fluid to pass through conduit 64 thereby retracting the piston rod of the associated cylinder 20 thus causing the forward end of the conveyor 16 and vine cutter to move downwardly until the cutter and conveyor move to their desired positions relative to the ground at which time the vines will be cut by the cutter 22 at the proper level below ground, and simultaneously the forward end of the conveyor 16 will be in a position to accept the vines and crop.

If a rise in the level of the ground is detected, the wheels 28 will raise thus moving the actuating arm 44 to pivot upwardly and actuate the double pole switch 40 in the opposite direction causing current to flow through the time delay relay 68 thereby delaying passage of the electrical power through the relay 68, and if the rise is substantial, to activate solenoid 70 thus shifting the valve 62 to a position wherein high pressure hydraulic fluid will enter the case end of the cylinder 20 and will move the lower end of the conveyor 16 and the cutter 22a upwardly to the desired level.

FIG. 6 discloses a modified hydraulic and electrical circuit 60a for maintaining the desired level of the lower end of the conveyor 16a and components attached thereto while harvesting at low and high speeds without causing the lower end of the conveyor to move up or down excessively in response to contacting rocks, clods, cucumbers or other crops being harvested.

Components of the modified hydraulic and electrical circuit 60a which are equivalent to those of the first embodiment of the invention will be assigned the same numerals followed by the letter "a".

The lightweight wheel 28a is journaled on one end of a yoke 78 that is pivoted to the sub-frame 26a at 79. A height sensor 80, such as a linear or rotary potentiometer, is pivotally connected between the other end of the yoke 78 and a bracket 82 secured to the sub-frame 26a. One or more hydraulic cylinders 20a are pivotally connected between the sub-frame 26a and the frame 12a of the conveyor 16a for raising and lowering the forward end of the conveyor in response to fluid received from the hydraulic portion of the circuit.

The hydraulic circuit includes a pump Pa which receives fluid from tank Ta and returns the fluid to tank Ta when in the illustrated neutral position. When the valve 62a is moved to its cross passage position, hydraulic fluid will flow from the pump Pa through a cross passage, the conduit 64a and to the rod end of the cylinder thereby lowering the forward end of the conveyor. Fluid returns to tank Ta from the case end of the cylinder through conduit 66a, a cross passage in the valve 62 to tank Ta. When the valve 62a is in its parallel passage position, fluid from pump Pa flows through a parallel passage, conduit 66a, and to the case end of the cylinder thereby raising the lower end of the conveyor. Fluid in the rod end of the cylinder returns to tank Ta through conduit 64a and a parallel passage in valve 62a.

The height sensor 80 sends a height signal to a variable filter 84, such as a variable low pass filter, Model No. MF4-50, manufactured by National Semi-Conductor, in response to the wheel 28a moving up or down when riding over an upwardly or downwardly inclined surface, which surface includes clods, rocks or vegetables. A ground speed sensor 86 such as a magnetic proximity switch senses the rate of rotation of a notched steel component 88 of the wheel drive train of the harvester 12a, and sends a ground speed signal to the variable filter. The height and speed signals are transmitted to a system controller 90, manufactured by Enerpac Mobile Power Products. The system controller transmits pulse width modulated signals to the solenoids 91,92 of valve 62a for controlling the flow of hydraulic fluid to the cylinder 20a proportional to the position error thereby maintaining the desired height of the lower arcuate end of the conveyor 16a and other components such as the transverse vine cutter 22a (if used) relative to the surface of the ground being harvested.

To compliment the system controller 90 a low pass tracking filter with cut off frequency of approximately 2 cycles per second at one mile per hour vehicle speed, and 10 cycles per second at three miles per hour vehicle speed is included in the height sensor 80. Also, a crossover circuit is provided in the height sensor for use at 0-miles per hour. If not provided, when the ground speed sensor fails, the height sensor signal will not pass through the variable filter.

In operation, the harvester is driven forwardly at a desired speed, for example between one and three miles per hour when harvesting cucumbers. The forward speed is determined by the ground speed sensor 86 which detects the rate of rotation of the metal component 88 and sends a speed signal to the variable low pass filter 84. The height sensor 80 sends a height signal to the variable filter. The variable filter uses the speed signal to vary the cutoff frequency from about two cycles per second at one mph vehicle speed, to ten cycles per second at three mph vehicle speed.

The variable filter 84 is used to change the height sensor signal in the system controller 90 as a function of vehicle speed. This is necessary because at three miles per hour, the height control system 10a must respond rapidly in order to maintain height control. This requires a high control system sensitivity, and it requires that all the information from the height sensor 80 be passed to the controller 90. Signals from rocks and clods do not present a problem because, at 3 MPH, they are of such short duration, high frequency, that it is not possible for the control system to respond to them even though they are present in the signal. However, with the high controller sensitivity setting necessary to properly respond at the high speed, the control system tends to be overly sensitive to rocks and clods at the 1 MPH slow speed. At this speed, it is possible for the control system to respond to every rock, clod, and cucumber, thus producing a very jerky header motion. The variable low pass filter 84 works by effectively filtering out the high frequency portion of the height sensor signal due to rocks and clods at the 1 MPH speed, and only passing the remainder of the signal into the system controller 90. Therefore, the header action is smooth. As the harvester speed increases, the low pass filter uses the ground speed sensor input 86 to increase the filter cut off point thus allowing more high frequency information from the height sensor 80 to pass into the system controller to maintain control. As mentioned before, the very high frequency information from rocks and clods do not present a problem to the control system because the system inertia ignores these signals.

The amount of raising and lowering of the lower end of the conveyor 16a (FIG. 6) and the cutter 22a is determined by the magnitude of the height variations in the soil as determined by the light weight wheels 28 a which at all times will be supported by the soil, while harvesting, in a manner similar to that described in relation to the first embodiment. The second embodiment differs from the first embodiment in that the controls for raising and lowering the lower end of the conveyor 16a employees analog circuitry which includes a height sensor 80, an adjustable variable filter 84 controlled by a ground speed sensor 86 which cooperates with notched steel component 88 that is included in the drive train of the harvester 12a.

The height sensor 80 is previously described as a linear or rotary potentiometer; the variable filter 84 may be a National Semi-Conductor Model MF4-50 filter; the ground speed sensor 86 may be a proximity switch which senses the ground speed of the vehicle. The ground speed and height control signals are sent to the system controller 90 which may be of the type manufactured by Enerpac Mobile Power Products. The above analog components cooperate to control the flow of hydraulic fluid to the cylinders 20a which raise or lower the lower arcuate end of the conveyor 16a and the attached vine cutters 22a thereby controlling the amount of raising and lowering of the lower end of the conveyor.

Also, the proportional system described above has the advantage of moving the adjusting cylinder 20a at a rate proportional to the height error. For example, if the ground slope were gradually changing, the controller would see a small error and move the valve position a small amount to slowly reposition the adjusting cylinder. But, if the slope changed more rapidly, a larger error would be seen, the hydraulic valve would be shifted further, and the adjusting cylinder would be moved more quickly to reposition the header. Thus, the second embodiment of the invention maintaining better control than can be achieved with the limit switch on/off control system of the first embodiment where the error signal is not related to the height error and the adjusting cylinder movement rate is not related to position error.

FIG. 7 illustrates two of a plurality of driven disc cutters 93 that cooperate with other disc cutters to define a second type of horizontal vine cutting assembly 94 which extends the full width of the header 15b (FIG. 8). The disc cutters 93 are supported on a transverse beam 95 connected to the lower ends of the movable legs 108 (only one being shown) in place of the transverse vine cutter 156 (FIG. 8) and its supporting legs.

Each horizontal vine cutting assembly 94 includes a disc 93 which is secured to a shaft 96 of a gear box 97 that is driven by a hydraulic motor 98. As shown in FIG. 7, the adjacent disc cutters overlap slightly and are angled forwardly and downwardly to a desired depth below the surface of the ground.

A third embodiment of a height control system 100 (FIG. 8) includes at least two parallelogram linkages 102 (only one being shown) having one leg 104 rigidly secured to the lower end of an inclined vine and crop receiving conveyor 106 of the type illustrated and described in the aforementioned cross-referenced application.

Each parallelogram linkage 102 includes a movable leg 108 pivotally connected to the leg 104 by a pair of arms 110. A hydraulic cylinder 112, illustrated as a single acting cylinder, is pivotally connected to the legs 104,108; and a lightweight wheel 114 is journaled on a yoke 116 that is pivoted to the associated movable leg 108 by a pin 118. A metering valve 120 for each height control system 100 is mounted on the movable leg 108.

The metering valve 120, illustrated at an enlarged scale, includes a housing 122 having a metering pin 124 slidably received and sealed in a bushing 126 screwed in the housing. The pin includes a frusto-conical end portion 128 which enters a metering port 130 in an intermediate wall 132 in the valve when the upper end of the metering pin is contacted by a cross member 134 on the yoke 116 and is moved downward (FIG. 8) toward the port 130. A lower wall 135 of the metering valve 120 includes a first port 136 connected to the lower end of the cylinder 112 by a conduit 138. The lower wall also includes a second or fluid bleeding port 140 which is connected to a hydraulic fluid tank Tb by a conduit 142 having a pilot operated check valve 144 and an adjustable bleed-off valve 145 therein. A three way control valve 146 (illustrated as a manually operated valve) is connected to a pressure compensated pump Pb by a conduit 147, and to tank Tb by a return conduit 148.

When the core of the valve 146 is in the illustrated automatic control or normal operating central position, fluid from pump Pb flows through conduit 147, a central passage 149 in the core of valve 146, and a pilot line 150 which pilots the check valve 144 open and allows fluid in the conduit 142 to continuously return to tank Tb through the adjustable bleed-off valve 145. The check valve 144 is positioned on the high pressure side of the bleed-off valve 145 to prevent check valve chatter. When in the above described central position, raising and lowering of the light weight wheel 114 due to variations in the level of the ground will maintain the harvesting components at the desired elevation relative to the surface of the ground. A bleed off orifice 154 is connected between return conduit 148 and the pilot line 150 to insure that the pilot operated check valve 144 will close when the manual valve is in either its parallel or cross passage positions.

When it is desired to raise the movable leg 108 of the parallelogram linkage 102 to a transport position with all harvesting components spaced above the ground, the valve 146 is shifted to the right into its parallel passage position. A detent 152 maintains the core in its parallel passage position until the core is manually moved to a different position. Fluid from the pump Pb then flows through a parallel passage in valve 146 into conduit 153. It will be noted that the high pressure fluid is prevented from returning to the tank Tb through the valve 146 by a plugged passage 154 in the housing of the valve 146. The high pressure fluid in conduit 147 flows through valve 146, conduit 153 and split conduit 138 into the lower end of the cylinder 112 and into the lower portion of the metering valve 120 through port 136. However, the fluid is blocked from flow to tank Tb by the closed pilot operated check valve 144. At this time the bleed off orifice 154 assures that the check valve 144 will close preventing fluid from flowing therepast into tank Tb. After the hydraulic cylinder 112 raises the leg 108 to its transport position, the pressure compensated pump Pb bypasses fluid to tank Tb by conventional means not shown.

If the operator wishes to lower the movable leg 108 of the parallelogram linkage 102 and components attached thereto, the operator shifts the core of the valve 146 to the left into the cross passage position. High pressure fluid from the pump Pb then flows through conduit 147, a cross passage in valve 146 and is blocked from further flow by the housing of manually operated valve 146. However, a second cross passage in the core of valve 146 permits the weight of the components supported by the member 108 to force fluid to flow from the lower end of the cylinder 112 through conduits 138 and 153, a cross passage in valve 146 and through conduit 148 to tank Tb thus lowering the harvesting components to a desired position relative to the ground.

When the valve 146 is returned to its illustrated centered position the height controlling operation is as follows:

When the contour of the ground under the light weight wheel lowers, the metering pin 124 is also lowered due to the weight of the wheel 114 and yoke 116 thereby further decreasing or preventing the flow of fluid through the port 130. Since the pilot operated check valve 144 is open at this time due to pressure in pilot line 150, fluid from hydraulic cylinder 112 flows through conduits 138, port 136 of metering valve 120 and flows out of port 140 through conduit 142, open check valve 144 and the bleed-off valve 145 to tank Tb until the leg 108 and metering valve moves downwardly a sufficient distance to cause high pressure fluid from conduit 156 to open metering pin 124 and flow through port 130. When the metering pin is raised sufficiently to cause the fluid pressure on both sides of port 130 to equalize, the harvesting components supported by the leg 108 will be maintained at the proper height relative to the surface of the ground.

When the contour of the ground under the light weight wheel raises, the metering pin 124 also raises thereby directing a greater volume of fluid from the pump Pb, through conduit 150 and port 130. A portion of this fluid flows through conduit 142, the open pilot operated check valve 150 and adjustable bleed-off valve 145 into tank Tb. The remaining fluid flows through conduit 138 into the lower end of hydraulic cylinder 112 thereby raising the metering valve housing 122 until the metering pin 124 is at the position wherein the pressure on both sides of the port 130 is again equalized thereby maintaining the desired elevation of the harvesting component such as a vine cutter 157 to remain at the desired depth relative to the surface of the ground. The bleed-off valve 145 may be adjusted to control the rate of flow of fluid through conduit 112 to tank Tb.

If it is desired to raise the harvesting components above the ground to a transport position, the core of valve 146 is moved to the right and is retained in the parallel passage position which prevents flow through the pilot line 150 thereby with the aid of the bleed orifice 151, allows the check valve 144 to close. Thus, high pressure fluid passes through a parallel passage in the core of valve 146, conduits 153 and 138 into the hydraulic cylinder 112 thereby raising the movable leg 108 which lifts and maintains the harvesting equipment into their transport position. When fully raised the pump Pb bypasses the hydraulic fluid in a manner well known in the art.

FIGS. 9-11 illustrate a fourth embodiment of a height control system 163 illustrating a plurality of rotary vine cutter assemblies 165, with each assembly 165 being independently raised or lowered relative to each other in order to cut plants, vines or foliage at the desired depth below the surface of the ground when the ground varies in elevation both longitudinally and transversely of the harvester as shown in FIG. 9.

Having reference to FIGS. 9 and 10, a frame 166 of a header or inclined conveyor 167 has a pair of upstanding legs 168 (FIG. 9) rigidly secured thereto. A generally horizontal beam 170 is rigidly secured to the upper end portions of the legs 168 for supporting the plurality of the rotary vine cutter assemblies 165, four assemblies being illustrated in FIG. 9.

Each vine cutter assembly 165 includes a parallelogram linkage 172 each having a pair of short legs 174 secured to the associated horizontal beam 170 (FIG. 10) by U-shaped brackets 176 and cap screws. A pair of long legs 180 of each parallelogram linkage is connected to the associated short legs by pairs of parallelogram arms 182. A hydraulic cylinder 184 is pivotally connected between the short legs and long legs by bars 186,188.

The amount of raising and lowering of the lower end of the conveyor 15b (FIG. 8) and cutters 93 (FIG. 7) or cutters 157 (FIG. 8) are determined by the magnitude of the height variations in the soil as determined by the light weight wheels 114 (only one being shown). The wheels 114 will at all times be supported on the ground while harvesting. The third embodiment differs from the first and second embodiments in that the variations in the contour of the ground are detected by the previously described hydraulic system which senses changes of the elevation of the ground in response to associated lightweight wheels 114 (only one being shown) which activate the metering valves 120 (only one being shown) as above described to cause the cutters to remain at the desired elevation relative to the surface of the ground contacted by the wheels.

A lightweight wheel 189 is pivotally supported on a yoke 190 that is pivotally connected to a bracket 192 secured to the associated pair of long legs 180. It will be understood that the lightweight wheel 189 of each of the four assemblies 165 may be raised or lowered independently of the other assemblies using anyone of the three previously described control circuits. However, as illustrated in FIG. 10, the circuit including the hydraulic metering valve 120 which is illustrated as being mounted on the long legs 180 by a bracket 193 with its metering pin 194 being in position to be actuated by the yoke 190.

A hydraulic motor 196 (FIG. 10), gear box 198 and disc cutter 200 are mounted on each long leg 180 with adjacent disc cutters being at slightly different elevations as shown in FIGS. 9 and 10. The spacing of the pairs of disc cutters 200 are illustrated in FIG. 11, as being staggered relative to each other thus permitting the pairs of cutters to move vertically past other pairs of cutters without interference while harvesting.

Having reference to FIG. 9, a pair of wheels 202 of the harvester are riding in ditches 204,206 which vary in elevation relative to a horizontal plane indicated by line 208. It will be noted that flat topped ridges 210,212, 214 and 216 vary in elevation relative to each other. Thus, in response to the particular type of height control systems used in the several rotary vine cutter assemblies 165, the disc cutter will cut all the vines or foliage at the desired distance below the ground except for a slight spacing between the two discs on each vine cutting assembly, which distance is exaggerated for clarity in FIG. 10.

Thus raising and lowering of the lower end of each rotary vine cutter assemblies 165 is substantially the same as that illustrated in the FIG. 8 embodiment except that the FIG. 8 embodiment requires only two height control systems 100 for raising and lowering the long vine cutter 157. The FIGS. 9–11 embodiment requires a plurality of rotary vine cutter assemblies 165 for independently controlling the depth of the associated groups of disc cutter 200, only two rotary cutters in each group being illustrated.

Although a pair of rotary cutters 200 have been shown on each vine cutter assembly 165, it will be understood that a short, non-rotatable cutter similar in width to the cutter 156 (FIG. 8) may be substituted for the rotary cutters.

From the foregoing description it will be apparent that the height control system of the present invention includes at least one lightweight wheel which is mounted for pivotal movement forward of or parallel to certain other ground engaging components of the harvester for detecting the varying height of the soil in an undisturbed area to be harvested. Hydraulic, electrical and analog circuits are disclosed and are responsive to the wheels detecting variations and contour of the ground which then moves components, such as the front end of a conveyor and a vine cutter, upwardly in response to detecting an elongated rise in the ground until the desired position is reestablished between the harvesting components and the ground. One embodiment of the invention includes a plurality of independently controlled height control systems capable of maintaining vine or plant cutters at a desired depth below the surface being harvested when that surface varies in elevation both longitudinally and transversely of the direction of movement of the harvester.

Conversely, the height control system will lower these harvesting components when the ground contours is detected to be lower and will maintain the desired position of the harvesting components relative to the ground. The system also includes components which will prevent upward movement of the harvesting components if the wheel bounces for short time intervals due to contacting vegetables, clods, or similar small items. The system also includes means for minimizing unwanted raising and lowering of harvesting components at different ground speeds in response to the height control wheel riding over spaced rocks, clods and vegetables or the like.

Although the best mode contemplated for carrying out the present invention has been herein shown and described, it will be apparent that modification and variation may be made without departing from what is regarded to be the subject matter of the invention.

What is claimed is:

1. An apparatus for maintaining the desired level relative to the ground of at least one vertically movable harvesting component of a ground supported mobile harvester when harvesting a crop growing on ground which varies in elevation, comprising:

means for supporting said at least one vertically movable component for substantially vertical movement on said harvester;

means for detecting variations in the level of the ground and plants forwardly of said at least one vertically movable harvesting component;

at least one power means for moving said at least one vertically movable harvesting component downwardly in response to detecting a depression in the ground and upwardly in response to detecting a rise in the ground;

at least two lightweight wheels supported on the harvester and rising on the crop and ground forwardly of said vertically movable harvesting component;

control means independently responsive to changes in elevation of said at least two lightweight wheels in either direction relative to a variable but generally planar ground level for maintaining said at least one vertically movable component at desired levels relative to the variable ground level; and means for momentarily interrupting the signal to said at least one power means in response to said at least two lightweight wheels riding over small articles on said generally planar surface for precluding upward movement of said components.

2. An apparatus according to claim 1 wherein said control means includes a hydraulic metering valve, an adjustable metering pin for controlling the rate of raising of the component, and ad adjustable bleed-off valve for controlling the rate of lowering of the component.

3. An apparatus according to claim 1 and additionally comprising means defining an adjustable time delay relay in said control means for allowing said wheel to roll over a small article on said surface without actuating said at least one power means.

4. An apparatus for maintaining the desired level relative to the ground of at least one vertically movable harvesting component of a ground supported mobile harvester when harvesting a crop growing on ground which varies in elevation comprising:

means for supporting said at least one vertically movable harvesting component for substantially vertical movement on said harvester;

means for detecting variations in the level of the ground and plants forwardly of said at least one vertically movable harvesting component;

at least one power means for moving said at least one vertically movable harvesting component downwardly in response to detecting a depression in the ground and upwardly in response to detecting a rise in the ground;

said means for detecting variations in the ground level additionally comprises;

at least two lightweight wheels supported on the harvester and riding on the crop and ground forwardly of said vertical movable harvesting component;

control means independently responsive to changes in elevation of said at least two lightweight wheels in either direction relative to a variable but generally planar ground level for maintaining said at least one vertically movable component at desired levels relative to the variable ground level;

an upright tube;

a substantially vertical upright rod rotatably received in tube;

bracket means rigidly secured to said rod;

switch means having a switch actuating element supported on said bracket means;

switch actuating means pivotally connected to said rod and operatively connected to said switch actuating element;

link means pivotally connecting said switch actuating means to said lightweight wheel; and a connector rigidly secured to said rod and pivotally connected to said switch actuating arm for actuating said switch in response to said wheel moving up or down in response to variations in the level of the surface being harvested.

5. An apparatus according to claim 4 and additionally comprising means defining an adjustable time delay relay allowing said wheel to roll over a small article on said surface being harvested without actuating said power means.

6. A height control system for maintaining the desired elevation of vertically adjustable harvesting components of a ground supported mobile harvester, comprising:

an inclined frame having a lower end portion;

a sub-frame formed at a parallelogram linkage supported by the lower end portion of said inclined frame;

a yoke pivotally supported on said sub-frame;

a lightweight wheel journaled on said yoke and riding over the surface being harvested forwardly of said vertically adjustable harvesting component supported by said inclined frame and sub-frame;

power means for selectively and vertically raising and lowering a portion of said sub-frame and vertically adjustable harvesting components;

switching means supported by said sub-frame and having an actuating element; and switch actuating means operatively connected between said yoke and said switch actuating element and responsive to variations in the level of the surface being harvested for actuating said power means for returning said components to the desired elevation relative to the surface being harvested.

7. In a self propelled row crop harvester having a cutter for severing plants and foliage from the ground, and having a crop conveyor for removing the plants and foliage from the ground, both of which must be positioned at predetermined distances relative to the surface of the ground, the improvement which comprises:

a sub-frame operatively connected to and projecting forwardly from the crop conveyor;

a yoke pivotally supported by the sub-frame;

a lightweight wheel rotatably connected to said yoke;

a tube rigidly secured to said sub-frame;

an upstanding rod rotatably received in said tube for movement about a substantially vertical axis;

a bracket secured to said rod for rotatable movement therewith;

a switch supported on said bracket and having an actuating element thereon;

a switch actuating arm connected to said rod for pivotal movement about a generally horizontal axis and including means for engaging said switch actuating element;

a link pivotally connecting said yoke to said switch actuating arm;

power means carried by said harvester and operatively connected to said sub-frame for varying the elevation of said cutter and said crop conveyor; and electrical control means including said switch and being responsive to the upward change in elevation of said wheel relative to said sub-frame for actuating said power means in a direction which raises said sub-frame to return said cutter and crop conveyor to said predetermined distance relative to said ground level.

8. An apparatus according to claim 7 wherein said electrical control means is responsive to downward changes in elevation of said wheel relative to said sub-frame for actuating said power means in a direction which lowers said sub-frame to return said cutter and crop conveyor to said predetermined distances relative to said ground surface.

9. An apparatus according to claim 7 and additionally comprising an adjustable time delay relay in said control means for precluding upward movement of said sub-frame when said wheel rides over a small article.

10. An apparatus according to claim 7 and additionally comprising resilient means interconnecting said yoke and said bracket for minimizing bouncing of said lightweight wheel when riding over small articles such as vegetables being harvested.

11. An apparatus according to claim 7 wherein a plurality of transversely spaced lightweight wheels are mounted on said harvester, wherein a plurality of control means are provided for generating signals, and wherein a signal from any one of said signal generating means is responsive to return said associated components to said desired position relative to said ground surface.

12. A method for maintaining the desired level of a plant handling component of a ground supported mobile harvester when harvesting a crop growing on the ground in response to ground level variations forwardly of the harvester; comprising the steps of:
supporting said plant handling component on said harvester for movement substantially normal to the ground;
detecting variations in the level of the ground forwardly of said harvesting component on undisturbed ground upon which plants to be harvested are growing;
moving said plant handling component downwardly in response to detecting a depression in the ground, and upwardly in response to detecting a rise in the ground;
at least one lightweight wheel being employed for detecting variations in the ground level forwardly of the harvester;
urging the wheel downwardly against the crop and ground;
generating a signal in response to said at least one wheel pivoting in either direction away from a normally generally planar harvester supporting surface;
directing a first signal in response to said at least one wheel being below said normal planar surface for lowering said component;
directing a second signal to said power means in response to said at least one wheel being above said normal planar surface for raising said components thereby maintaining said component at the desired levels; and
momentarily interrupting said signal to said power means in response to said at least one lightweight wheel riding over a small article on said normal generally planar surface for precluding upward movement of said components.

13. An apparatus for maintaining the desired level of a plant handling component of a ground supported mobile harvester when harvesting a crop, comprising;
means for supporting a portion of the plant handling component on the harvester upon ground which varies in elevation and has small articles thereon;
height sensing means for detecting height variations of the ground and said small article by movement of the height sensing means over the ground and article;
power means for selectively raising and lowering said component;
means for actuating said power means for raising said plant handling component in response to sensing variations in the height of the ground and in response to movement of the height sensing means over the ground which varies in elevation, while precluding height adjustments of the plant handling components in response to movement over said small articles;
means for detecting the ground speed of the vehicle; and
means for controlling the actuation of the power means to raise at least a portion of the plant handling component only after a delay of about ½ second after contacting a small article when the harvester is traveling at about one mile per hour, and after a delay of about 1/6th second when the harvester is traveling at about three miles per hour.

14. An apparatus according to claim 13 wherein said plant handling component is a cutter and wherein the cutter is adjusted to maintain a substantially constant distance below the ground.

15. An apparatus for maintaining the desired level below the ground of at least one vine cutter of a ground supported self-propelled mobile harvester when harvesting a crop growing on ground which varies in elevation and has small articles thereon comprising;
means for supporting a portion of said vine cutter for vertical movement on said harvester;
wheel means for detecting variations in the level of the ground and plants;
power means for moving a portion of said vine cutter downwardly in response to detecting a depression in the ground and upwardly in response to detecting a major rise in the ground;
height sensor means and ground speed sensor means responsive to both vehicle ground speed and said wheel means rolling over small articles spaced apart on the ground for precluding actuation of said power means for changing the elevation of said vine cutter;
said ground speed sensor means for detecting ground speed includes said ground speed sensor means which detects the rate of rotation a component of a drive train of the vehicle which provides a ground speed signal, and wherein said height sensor means for detecting the height of said wheel means rolling over ground which varies in elevation provides said height control signals.

16. An apparatus according to claim 15 and additionally comprising means defining a variable filter which receives and processes said ground speed signal and said height control signal for sending a variable filter signal; means defining a system controller for receiving said variable filter signal and transmitting height variation signals to said power means for changing the elevation of said vine cutter only when a major depression or major rise in the ground is detected.

17. An apparatus according to claim 16 wherein said power means raises said vine cutter in response to movement of the height sensor means over ground which varies in elevation while precluding height adjustment of said vine cutter in response to movement over spaced ones of said small articles.

18. An apparatus according to claim 17 wherein said ground speed sensor means detects the ground speed of the vehicle and controls the actuation of said power means for raising at least a portion of the vine cutter only after a delay of about ½ second after contacting a small article when the harvester is traveling at about one mile per hour, and after a delay of about 1/6th of a second when the harvester is traveling about three miles per hour.

19. A method of maintaining the desired level of a plant handling component of a ground supported mobile harvester relative to the ground when harvesting a crop, comprising the steps of:
 supporting a portion of the plant handling component on the harvester which is driven on ground that varies in elevation and has small articles thereon;
 detecting height variations of both the ground and the small articles by movement of a height sensing means over the ground and article;
 actuating power means for raising a portion of the plant handling component in response to sensing variations in the height of the ground and in response to movement of the height sensing means over the ground while precluding height adjustments of the plant handling component in response to movement over spaced ones of said small articles;
 detecting the ground speed of the vehicle; and
 controlling the actuation of the power means to raise at least a portion of the plant handling component only after a delay of about ½ second after contacting a small article when the harvester is traveling about one mile per hour, and after a delay of about 1/6th second after the harvester is traveling at about three miles per hour.

20. An apparatus for maintaining the desired level relative to the ground of at least one harvesting component of a mobile harvester when harvesting a crop growing on ground which varies in elevation, comprising:
 component supporting means for selectively raising and lowering the component;
 hydraulic power means for changing the elevation of said component;
 a hydraulic metering valve having a housing supported by said component supporting means and having an intermediate wall with a metering port therein dividing said housing into an inlet chamber and an outlet chamber;
 a metering pin slidably received in said housing for varying the size of said port;
 means for detecting variations in the level of the ground and plants forward of said harvesting component for controlling the movement of said metering pin;
 means for detecting variations in the level of the ground and plants forward of said harvesting component for controlling the movement of said metering pin; and
 means defining a bleed-off valve; said metering pin reducing the effective size of said port in response to detecting a lowering of the level of said ground for lowering said component, and increasing the effective size of said port in response to detecting a rise in the level of said ground for raising said component.

21. An apparatus according to claim 20 wherein said component supporting means is a movable leg of a parallelogram linkage, and wherein said power means includes a hydraulic cylinder connected between the movable leg of said parallelogram linkage and a portion of said harvester rigid with a second leg of said parallelogram linkage.

22. An apparatus according to claim 20 wherein said harvesting component is a vine cutter.

23. An apparatus according to claim 20 wherein said metering pin includes a frusto-conical end portion for gradually varying the effective size of said port for controlling the rate of movement of said component in response to raising of the component.

24. An apparatus according to claim 20 wherein said bleed-off valve controls the rate of movement of the component in response to lowering of said component.

25. An apparatus according to claim 21 wherein said bleed-off valve is an adjustable bleed-off valve which may be varied to change the rate of lowering said components in accordance with changes of harvesting speeds.

26. An apparatus according to claim 20 wherein said means for detecting variations in the level of the ground comprises a lightweight wheel riding on the ground and plants forwardly of the harvester, and wheel supporting means movably connected to said component supporting means in position to control the movement of said metering pin.

27. An apparatus according to claim 26 wherein said wheel supporting means includes an elongated yoke in position to engage said metering pin, and pivot means for pivoting said yoke to said component supporting means at a point close to said pin for minimizing movement of the metering pin in response to riding over small articles such as rocks, clods and fruit thereby minimizing undesirable momentary raising and lowering of said component due to said small articles.

28. An apparatus for cutting a wide swath of plants a predetermined distance below the surface of ground which varies in elevation both longitudinally and transversely of the path of movement of a harvester comprising:
 means defining at least three independently controlled transversely spaced plant cutter assemblies on the harvester;
 means defining at least one cutter on each cutter assembly;
 means for driving the harvester over the plants to be cut;
 means on each cutting assembly for independently sensing the variations in the elevation of the ground below the associated assembly both transversely and longitudinally of the harvester;
 means on each cutter assembly for moving the associated cutter to the desired depth of cut in response to sensing variations in the ground level therebelow both transversely and longitudinally of the vehicle;
 control means on each assembly responsive to said sensing means for moving the associated cutter means to the desired elevation for cutting the plants at said predetermined distance below the ground.

29. An apparatus according to claim 28 wherein said cutters are rotary disc cutters, and additionally comprising means for rotating said cutters.

30. An apparatus according to claim 28 wherein said means for sensing the variation in the elevation of the ground comprises a plurality of transversely spaced lightweight wheels operatively connected to associated ones of said moving means and control means for independently controlling the movement of said plant cutter to the desired depth of cut.

31. An apparatus according to claim 28 wherein said cutters are driven rotary cutters and wherein at least two cutters are supported on each cutter moving means, said cutters on each cutter moving means being staggered longitudinally of the vehicle for allowing cutters on the adjacent cutter moving means to be adjusted to positions above or below each other.

32. An apparatus according to claim 28 wherein said cutters are short transversely extending cutter bars.

33. In a ground supported mobile harvester for harvesting a crop growing on ground which varies in elevation longitudinally and transversely of the direction of movement of the harvester, a height control system comprising:

frame means on said harvester including a substantially horizontal beam extending over the width of a swath of plants to e harvested;

a plurality of independently controlled transversely spaced parallelogram linkages secured to said horizontal beam with each parallelogram linkage having at least one long leg;

a cutter attached to each long leg;

independent power means for each of said parallelogram linkages for independently raising and lowering the associated long legs;

ground engaging means pivotally connected to associated ones of said parallelogram linkages for independently detecting variations in the level of the ground forwardly of and in the path of movement of an associated cutter; and control means responsive to the height of an associated ground engaging means for actuating said power means as required to maintain the associated cutter at the desired cutting depth below the surface of the ground.

34. A method of cutting a wide swath of plants a predetermined distance below the ground which varies in elevation both longitudinally and transversely of the path of movement of a harvester having a plurality of transversely spaced plant cutters thereon, comprising the steps of:

independently sensing variations in the elevation of the ground at at least three locations both transversely and longitudinally of the path of movement of the harvester;

independently moving at least one cutter in each location to the desired depth of cut in the associated locations in response to the sensed variation in elevation of the ground at said associated locations; and cutting the plants at said desired predetermined distance below the ground at each of said plurality of locations.

35. A method according to claim 34 and additionally comprising the step of driving said cutters as the harvester is driven over the vines being cut.

36. A method according to claim 34 wherein the step of sensing the variation in elevation is detected by a plurality of lightweight wheels spaced transversely of the harvester and contacting the ground and plants forwardly of the associated plant cutters.

* * * * *